Aug. 8, 1950     O. W. INSKEEP     2,518,237
BALED HAY SEPARATOR

Filed Jan. 3, 1947     3 Sheets-Sheet 1

INVENTOR.
O. W. Inskeep
BY
ATTYS

Aug. 8, 1950  O. W. INSKEEP  2,518,237
BALED HAY SEPARATOR
Filed Jan. 3, 1947  3 Sheets-Sheet 2

INVENTOR.
O. W. Inskeep
BY
ATTYS

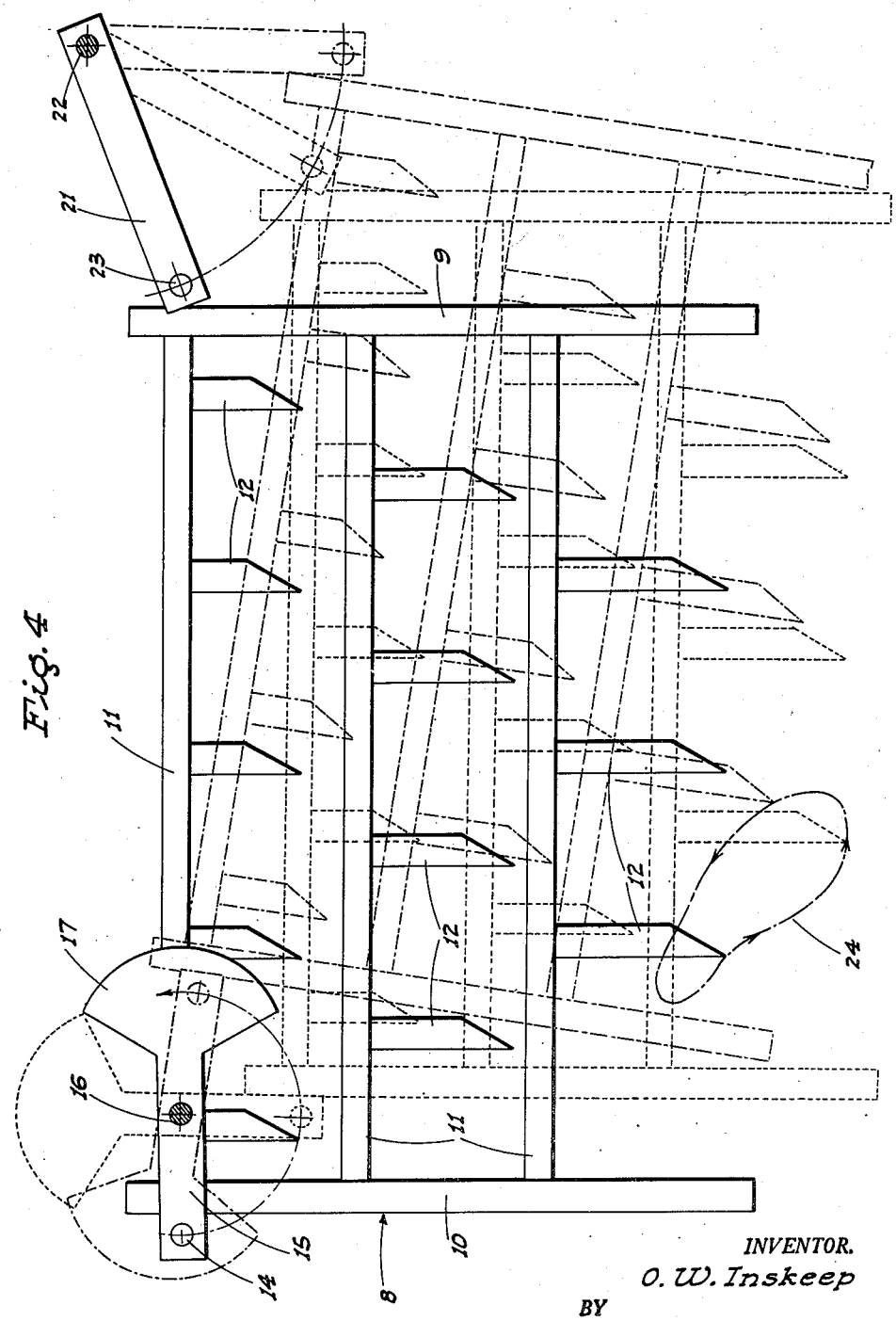

Patented Aug. 8, 1950

2,518,237

UNITED STATES PATENT OFFICE 2,518,237

BALED HAY SEPARATOR

Oliver W. Inskeep, Stockton, Calif., assignor to Higginbotham & Son, Lodi, Calif., a partnership Application January 3, 1947, Serial No. 720,127

2 Claims. (Cl. 146—160)

1

This invention is directed to, and it is an object to provide, a baled hay separator which comprises an improvement over the machine shown in U. S. Patent No. 2,324,159, dated July 13, 1943.

The present invention contemplates, as an object, the provision of a baled hay separator wherein the mounting and actuating mechanism is simplified and more readily adaptable to commercial manufacture; eliminating the multiple, interconnected crank assembly of the previous patent.

An additional object of the invention is to provide a baled hay separator, of the type described, operative to effect an improved separating action on the baled hay, which action—in addition to shredding the compressed hay—tends to "fluff" the same.

A further object of the invention is to provide a baled hay separator which is portable, but includes means for stable support of the machine, from the ground, for operation.

A further object of the invention is to produce a simple and inexpensive baled hay separator, and yet one which will be exceedingly effective for the purpose for which it is designed.

These objects are accomplished by means of such structure and relative arrangement of parts as will fully appear by a perusal of the following specification and claims.

In the drawings:

Fig. 4 is a side elevation of one of the shredder frames, detached, showing the manner of its mounting and actuation.

Figure 1:
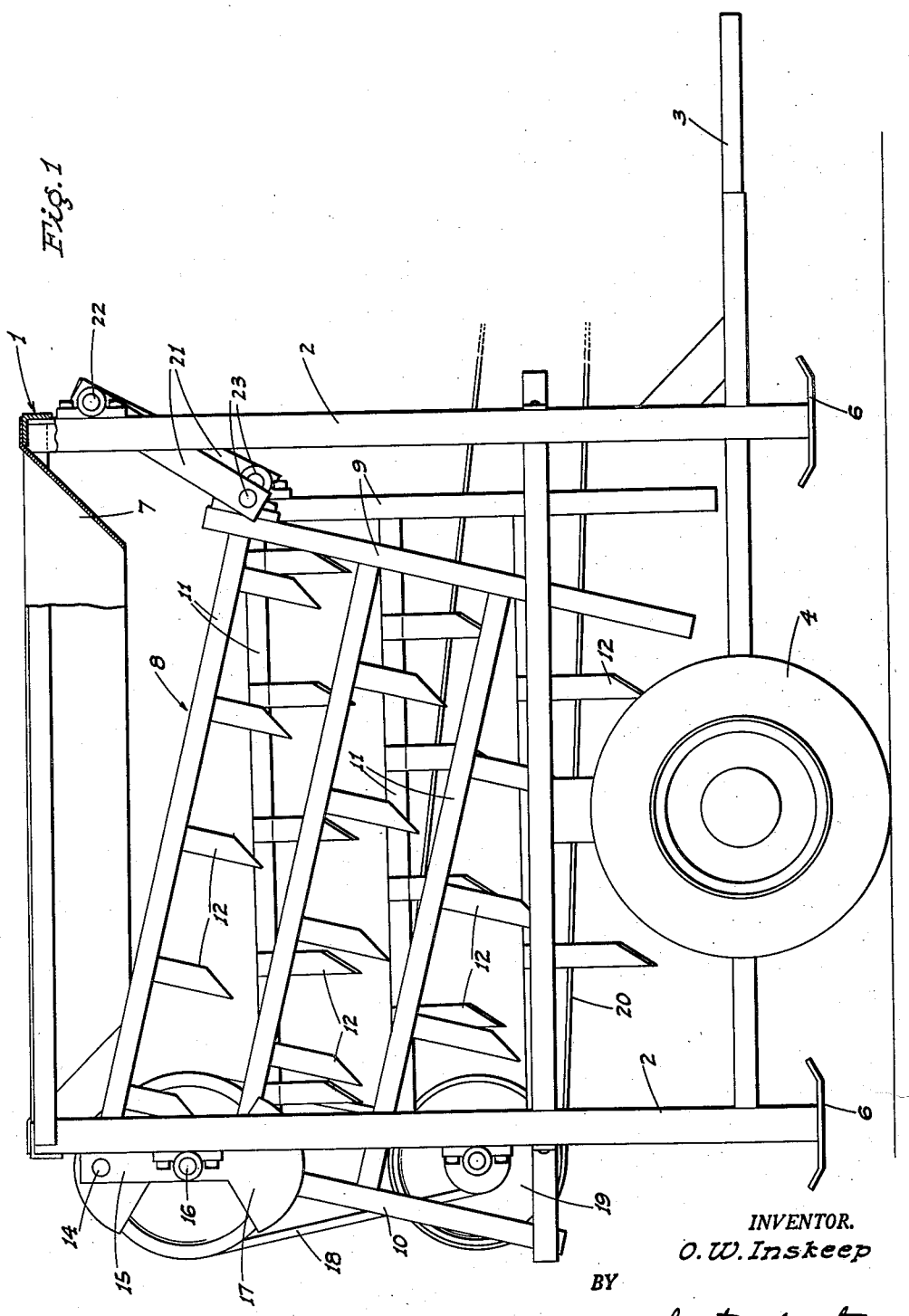
Fig. 1 is a side elevation of the improved baled hay separator.
Figure 2:
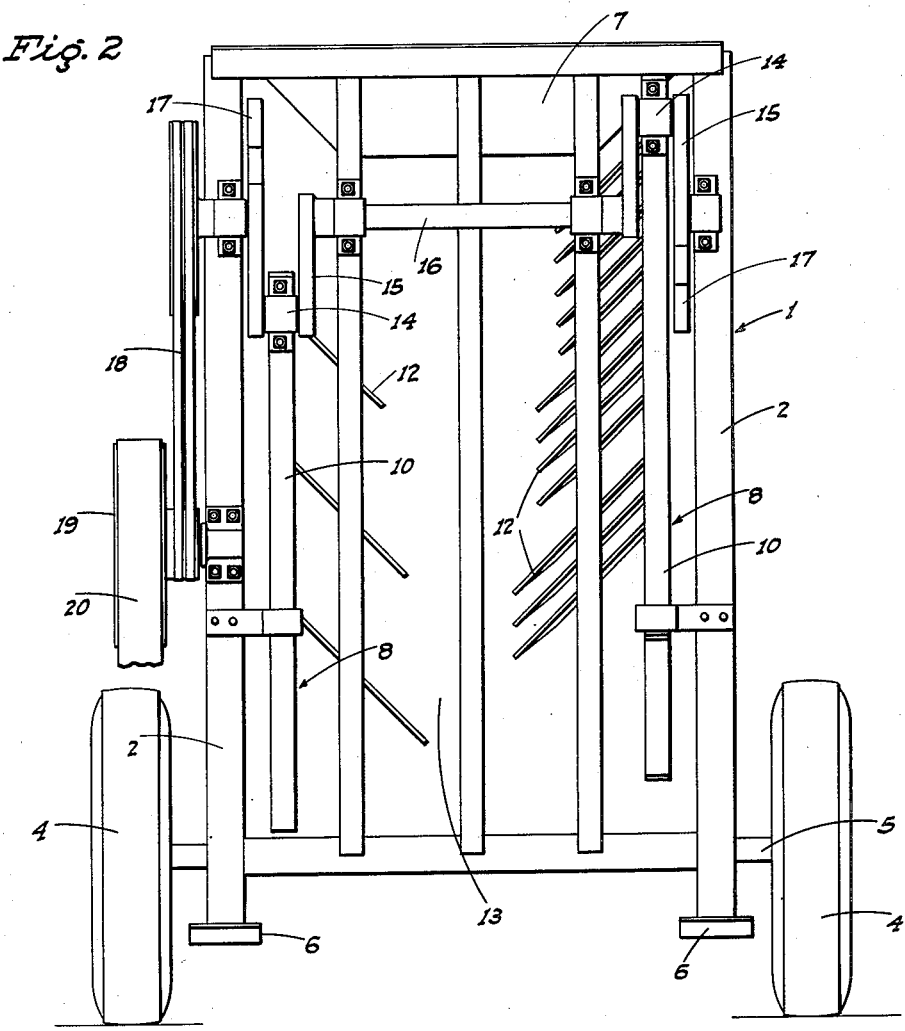
Fig. 2 is a rear end view of the machine.
Figure 3:
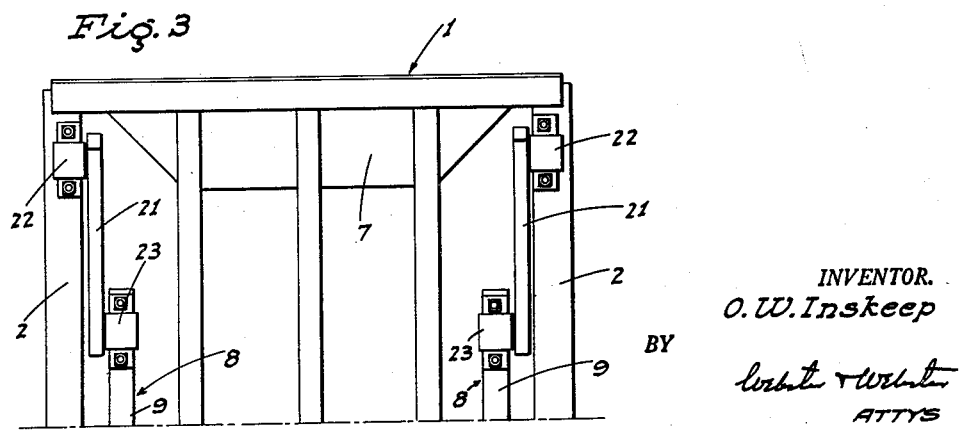
Fig. 3 is a fragmentary front end view of the machine.

Referring now more particularly to the characters of reference on the drawings, the improved baled hay separator comprises an upstanding rigid main frame, indicated generally at 1; such main frame being rectangular and of open or skeleton construction, including corner posts 2. A tongue 3 projects rigidly from the front of the main frame at the bottom and centrally of its sides; said tongue being adapted for connection with a draft vehicle. The implement is supported, for transport, by a transversely spaced pair of pneumatic-tired wheels 4 carried on an axle 5 disposed intermediate the front and rear of the main frame 1.

At their lower ends the corner posts 2 are fitted with feet 6 whereby the machine may be blocked

2 up for operation, so as to prevent undue vibration and to relieve the wheels 4 from the load.

At the top the main frame 1 is formed with a hopper 7 which extends substantially full length of said main frame; the latter being elongated somewhat so that it is of greater length than width.

Below the hopper 7 the frame supports the shredding mechanism, which comprises the following:

A pair of upstanding, longitudinally extending, teeth-supporting frames 8 (hereinafter called the shredding frames) are disposed within the main frame 1 in transversely spaced-apart relation.

The shredding frames 8 each include a front end post 9 and a rearward end post 10; corresponding front and rear posts being connected, in vertically spaced relation, by rigid bars 11, there being three of such bars in each shredding frame.

Each of the bars 11 is fitted with a longitudinal row of flat but pointed teeth 12 disposed in spaced-apart relation lengthwise of said bar; the teeth each being disposed at a laterally inward, downward incline.

The teeth on the bars 11 progressively increase in length with each lowermost bar so that the throat of the machine, as indicated at 13, becomes of progressively lesser width from top to bottom.

At their upper rear corners the shredding frames 8 are journaled, as at 14, in connection with cranks 15 included in a cross shaft 16, rotatably mounted on the rear end of the main frame 1 transversely thereof. Each of the cranks 15 is counterbalanced, as at 17, and said cranks 15 are disposed to run approximately 180° apart.

The cross or crank shaft is driven from one end by a multiple endless belt and pulley unit 18, actuated by a pulley 19 driven from a belt 20. The belt 20 is driven from any suitable power source, as for example the power take-off shaft of a tractor to which the machine may be connected.

At the end opposite the cranks 15, i. e. at the front and at the upper corner thereof, the shredding frames 8 are each suspended by a swing link 21. The swing links 21 are journaled, as at 22, in connection with corresponding end posts 2 for swinging motion in a longitudinal vertical plane, and said links depend from the journals 22 to journals 23 connected with corresponding swing frames 8 at the upper ends of the end posts 9 thereof.

When each crank 15 is at the bottom of its throw, the corresponding shredding frame 8 is substantially horizontal, while at the top of the crank throw such shredding frame is disposed at an upward and rearward incline. See the far frame and rear frame, respectively, of Fig. 1.

Upon rotation of the cranks the shredding frames each reciprocate through an endless curved path which includes longitudinal, as well as up-and-down, motion. See the illustration, in Fig. 4 at 24, of the path which each tooth traverses upon each revolution of the corresponding crank.

When the machine is in operation with the shredding frames reciprocating as above described (said frames reciprocating in opposition, or 180° apart), baled hay is fed into the machine through the hopper 7, working its way down between said shredding frames 8, whence the baled hay is effectively shredded by the teeth 12. The reciprocatory path of the teeth is such that not only is the highly compressed baled hay very effectively shredded, but a certain fluffing action is imparted thereto, so as to well loosen the hay for subsequent use.

The separated or shredded hay, as well loosened, falls from the main frame 1 onto the ground or into any suitable catch means, which may be a carry-off conveyor (not shown).

The described baled hay separating machine is designed so that it is simple and yet practical in structure and operation; the structure being especially well adapted to commercial manufacture.

From the foregoing description it will be readily seen that there has been produced such a device as substantially fulfills the objects of the invention as set forth herein:

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A baled hay separator comprising an upstanding, main frame, a pair of transversely spaced, upstanding shredding frames having laterally inwardly projecting teeth thereon, said shredding frames being disposed in the main frame and adapted for longitudinal reciprocation, a transverse crank shaft journaled in the main frame adjacent one end of the shredding frames, cranks on said shaft corresponding to the shredding frames, means connecting said shredding frames at said one end in suspended relation to the corresponding cranks, a transversely spaced pair of swing links journaled in the main frame adjacent the other end of the shredding frames, the links being swingable lengthwise of the same, the length of the links being substantially greater than the eccentricity of the cranks, means suspending the shredding frames at said other end from the swing links, the lower ends of the shredding frame hanging free, and means to rotate the crank shaft; said cranks, corresponding to the shredding frames, being opposed, and each crank including counterbalance means.

2. A baled hay separator comprising a main upstanding suporting frame, a crank journaled in the main frame adjacent one upper corner thereof, means to rotate the crank, a depending swing link journaled in the main frame adjacent the other upper corner thereof, a substantially rectangular shredding frame carrying vertically spaced and laterally projecting shredding knives, one upper corner of the shredding frame being swingingly suspended from the crank pin and the other upper corner of the shredding frame being swingingly suspended from the lower end of the link, the length of the link being substantially greater than the eccentricity of the crank, the top edge of the shredding frame being disposed substantially horizontal only when the crank pin is in its lowermost position whereby with the rotation of the crank the shredding frame will reciprocate in a curved endless noncircular path.

OLIVER W. INSKEEP.

REFERENCES CITED

The following references are of record in the file of this patent:

UNITED STATES PATENTS

| Number | Name | Date |
|---|---|---|
| 616,254 | Phillips | Dec. 20, 1898 |
| 852,052 | Bechtol | Apr. 30, 1907 |
| 1,777,126 | Muhrbeck | Sept. 30, 1930 |
| 2,324,159 | Higginbotham | July 13, 1943 |